United States Patent
Moran et al.

(10) Patent No.: US 10,454,185 B1
(45) Date of Patent: Oct. 22, 2019

(54) INTERFEROMETRIC DIRECTION FINDING ANTENNA

(71) Applicant: Rockwell Collins, Inc., Cedar Rapids, IA (US)

(72) Inventors: Jiwon L. Moran, Marion, IA (US); James B. West, Cedar Rapids, IA (US); Brandon C. Hamilton, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 182 days.

(21) Appl. No.: 15/624,147

(22) Filed: Jun. 15, 2017

(51) Int. Cl.
| | |
|---|---|
| *H01Q 21/00* | (2006.01) |
| *H01Q 21/26* | (2006.01) |
| *G01S 13/44* | (2006.01) |
| *G01S 13/90* | (2006.01) |
| *G01S 3/48* | (2006.01) |

(52) U.S. Cl.
CPC ........... *H01Q 21/0087* (2013.01); *G01S 3/48* (2013.01); *G01S 13/4454* (2013.01); *G01S 13/9023* (2013.01); *H01Q 21/26* (2013.01)

(58) Field of Classification Search
CPC .................................................. H01Q 21/0087
USPC ....................................................... 343/853
See application file for complete search history.

(56) References Cited

U.S. PATENT DOCUMENTS

| | | | | |
|---|---|---|---|---|
| 3,266,044 | A * | 8/1966 | Bresler .................. | H01Q 11/10 343/792.5 |
| 2003/0034931 | A1* | 2/2003 | Shepherd ............... | H01Q 11/10 343/792.5 |
| 2007/0182655 | A1* | 8/2007 | Lee ....................... | H01Q 11/105 343/792.5 |
| 2017/0294720 | A1* | 10/2017 | Murakowski ............ | H01Q 9/28 |

* cited by examiner

*Primary Examiner* — Peguy Jean Pierre
(74) *Attorney, Agent, or Firm* — Donna P. Suchy; Daniel M. Barbieri

(57) ABSTRACT

Systems and apparatuses include a radio frequency feed configured to connect to a feedline, and a plurality of radiating elements coupled with the radio frequency feed. Each radiating element is arranged at an oblique angle relative to an antenna axis and configured to radiate at a wavelength (λ). The plurality of radiating elements define a phase center distance between about 0.15λ and about 0.2λ.

23 Claims, 9 Drawing Sheets

INTERFEROMETRIC DIRECTION FINDING ANTENNA

BACKGROUND

Direction finding (DF) antennas utilize spatial separation of antenna elements and measure a phase difference to calculate an angle of arrival to determine the source direction of a radiowave signal or the location of an object. Department of Defense systems may use direction finding for electronic warfare, navigation, search and track pursuits.

Ultra high frequency (UHF) and very high frequency (VHF) direction finding antennas are based on a pseudo Doppler technique requiring a complicated antenna that electronically rotates a view of the antenna. Interferometric direction finding antennas are omni-directional, and use a dipole structure. However, dipole structures result in a high profile (e.g., a half of wavelength) and a limited bandwidth. In some cases, the DF antenna may include four UHF radiating elements and four VHF radiating elements or a total of eight dipole radiating elements. The UHF and VHF radiating elements are each sized and spaced to provide spatial separation suitable for the target wavelengths and lead to large profiles.

Log periodic (LP) antennas provide ultra-wideband (UWB) operation by providing multiple radiating elements and allowing an active radiating region that moves with frequency. The type of radiating elements, the number of radiating elements, and a log scale factor (tau) determine the bandwidth and gain of the LP antenna system. LP antennas provide a cardioid "cos(θ)" element pattern that has directional tendencies. The radiation patterns tend to become more directional as frequency increases.

In antenna design, a phase center is the effective origin of a signal where the radiated field of the signal spreads outward and has equal phase. In direction finding, the distance between phase center of each antenna and the feed center of four antenna elements while maintaining omni-directionality plays a key role in determining ambiguity of the signal.

SUMMARY

Embodiments of the inventive concepts disclosed herein use a modified log periodic antenna array to attain a broad bandwidth with optimum phase center movement. In some exemplary embodiments, four sets of nine or more elements are used. The log periodic antenna is fed from the shortest element and designed to control and maintain a distance between about 0.15λ to about 0.2λ to phase center for each frequency as the active region changes. The individual radiating elements are arranged at an oblique angle relative to a feedline to defocus a cardioid pattern from the shorter radiating element. By introducing the oblique angle, the radiation field is focused toward the longer elements resulting in omni-directionality, minimizing interference, and decreasing the profile or height of the log periodic antenna. Additionally, embodiments described herein can be scaled to lower or higher frequencies and be modified to different construction approaches. Log periodic antennas described herein are used in direction finding antenna systems. In addition, the basic array structure can be used for omni-directional ultra-wide band (UWB) antenna systems, used as communications, navigation and surveillance systems, for example.

In one aspect, embodiments of the inventive concepts disclosed herein are directed to an apparatus that includes a radio frequency feed configured to connect to a feedline, and a plurality of radiating elements coupled with the radio frequency feed. Each radiating element is arranged at an oblique angle relative to an antenna axis and configured to radiate at a wavelength (λ). The plurality of radiating elements define a phase center distance between about 0.15λ and about 0.2λ.

In a further aspect, embodiments of the inventive concepts disclosed herein are directed to a system that includes a plurality of log periodic antenna units, and a controller. Each of the plurality of log periodic antenna units includes a substrate, a radio frequency feed coupled to the substrate and configured to connect to a feedline, and a plurality of radiating elements coupled with the substrate. Each radiating element is arranged at an oblique angle of between about twenty-five degrees (25°) and about sixty-five degrees (65°) relative to an antenna axis. The controller is in communication with the radio frequency feeds and structured to determine an angle of arrival of a radio signal.

In a further aspect, embodiments of the inventive concepts disclosed herein are directed to a method that includes 3D printing a non-conductive substrate, 3D printing a first set of radiator element dipoles, each arranged at an oblique angle relative to an antenna axis, 3D printing a second set of radiator element dipoles associated with the first set, each arranged at the oblique angle, and 3D printing a trunk in electrical communication with the first set and the second set.

BRIEF DESCRIPTION OF THE FIGURES

Exemplary embodiments will become more fully understood from the following detailed description, taken in conjunction with the accompanying drawings, wherein like reference numerals refer to like elements, and:

FIG. 13a is a pictorial view of an exemplary embodiment of an antenna system including the antenna unit of FIG. 8;

FIG. 13b is a front view of the antenna system of FIG. 13a; and

FIG. 13c is a top view of the antenna system of FIG. 13a.

DETAILED DESCRIPTION

Following below are more detailed descriptions of various concepts related to, and implementations of, methods, apparatuses, and systems for a direction finding antenna system. The various concepts introduced above and discussed in greater detail below may be implemented in any number of ways, as the concepts described are not limited to any particular manner of implementation. Examples of specific implementations and applications are provided primarily for illustrative purposes.

Existing direction finding antenna systems have shortfalls including complexity of design, directionality, limited bandwidth, large profile, and undesirable phase center layouts. In some embodiments, antenna systems according to the inventive concepts disclosed herein have: 1) a simple structure and operational system, 2) an omni-directional radiation pattern, 3) a wide bandwidth (e.g., 1-3 GHz), 4) a low profile, and 5) a desired phase center layout (e.g., a distance between the phase center and a feed center is between about 0.15λ and about 0.2λ).

In general, embodiments of the inventive concepts disclosed herein provide a log periodic (LP) antenna system that includes four LP units coupled together. Each LP unit includes multiple radiating elements, structured to communicate with different wavelength signals. The LP antenna has a moving active region surrounded by a director (shorter element) and a reflector (longer) which enables broad frequency coverage. The direction finding LP antenna system utilizes a phase delay recognized between the four LP units to determine an angle of arrival of a target signal. The radiating elements of the LP units are arranged at an oblique angle relative to an antenna axis. In some embodiments, a radio frequency (RF) feed is located at a director side of the LP unit and the radiating elements are angled toward the RF feed. The angled radiating elements focus radiation toward the longer radiating elements (i.e., reflector elements) and improve the omni-directional characteristics of the LP unit. The angled radiating elements reduce directionality, in some embodiments.

In some embodiments, an LP antenna system includes four LP units, each with multiple angled radiating elements. In some embodiments, the LP antenna system uses a simple or passive LP system including no switches or active components, and an active region of the LP antenna system changes automatically and continuously. In some embodiments, the angled arrangement of the radiating elements focuses radiation toward the longer reflector radiating elements and reduces directionality. In some embodiments, using nine radiating elements on each LP unit provides a bandwidth of 1-3 GHz. Increasing the number of elements can increase the bandwidth. In some embodiments, the angled arrangement of the radiating elements reduces the profile or height of the LP antenna system. In some embodiments, the height of each LP unit is reduced by about forty-nine percent (49%) when compared with existing direction finding antennas. In some embodiments, a desirable phase center distance is maintained by locating the RF feed on the director side of each LP unit. In some embodiments, the phase center to DF array center distance is arranged to be between about 0.15λ and about 0.2λ by introducing vertical feed points. In some embodiments, the LP antenna system has all the characteristics of this paragraph.

Figure 1:
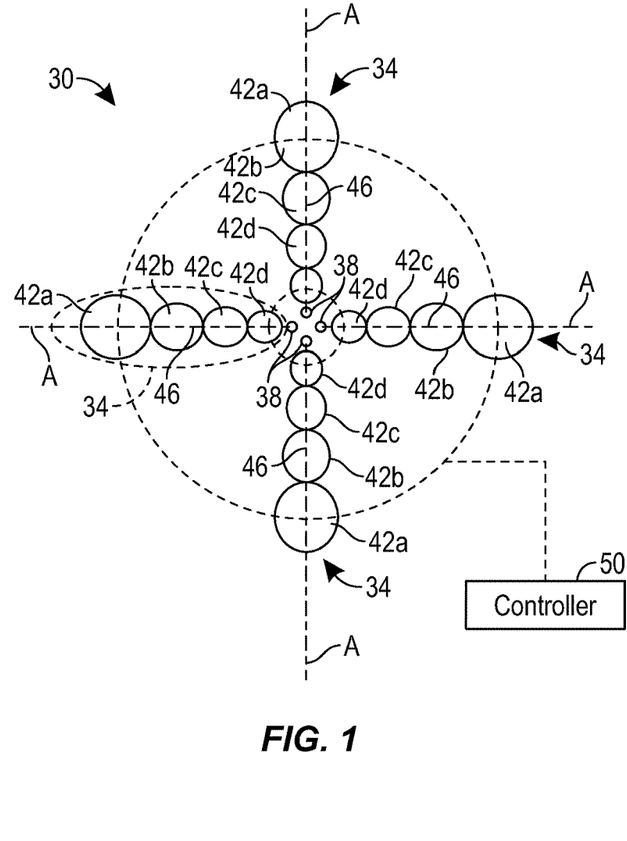
FIG. 1 is a schematic view of an exemplary embodiment of an antenna system according to the inventive concepts disclosed herein.

As shown in FIG. 1, an antenna system in the form of a log periodic (LP) antenna system 30 includes four antenna units in the form of LP units 34. Each LP unit 34 includes a radio frequency (RF) feed 38 and four radiating elements 42a-d. In some embodiments, less than four LP units 34 or more than four LP units 34 may be included. Additionally, more than four radiating elements 42 or less than four radiating elements 42 may be included. In some embodiments, the RF feed 38 may be replaced with other connectors, as desired.

Each LP unit 34 is structured along an antenna axis A, and each radiating element 42a-d is electrically coupled to a trunk 46 that provides communication between the RF feed 38 and the radiating elements 42a-d. The radiating element 42a is structured to communicate with lower frequency signals than the radiating element 42d, and the LP unit 34 is arranged with the higher frequency radiating element 42d positioned adjacent to the RF feed 38. In some embodiments, the LP unit 34 is arranged with the director positioned adjacent the RF feed 38 as opposed to the more common arrangement with the reflector positioned adjacent the RF feed 38. Arranging the director (e.g., the radiating element 42d) adjacent to the RF feed 38 results in a wavelength normalized distance between a phase center location of each radiating element 42a-d to the physical center of the LP unit 34 being approximately equal. This alignment of the phase centers with the physical LP center provides a high level of direction finding accuracy and definite (i.e., non-ambiguous) results. The four LP units 34 are arranged at ninety degrees (90°) relative to one another, and the LP antenna system 30 provides a three-hundred-sixty degree (360°) omni-directional direction finding coverage.

A controller 50 is electrically coupled to the LP antenna system 30 and communicates with the RF feeds 38 of each LP unit 34. The controller 50 is structured to determine a phase delay of signals received by the four LP units 34 and to determine an angle of arrival based on the phase delays (at least in part). In some embodiments, the controller 50 is any direction finding controller, radio system controller, circuit, algorithm, or other controller or system component in communication with the LP units 34.

Figure 2:
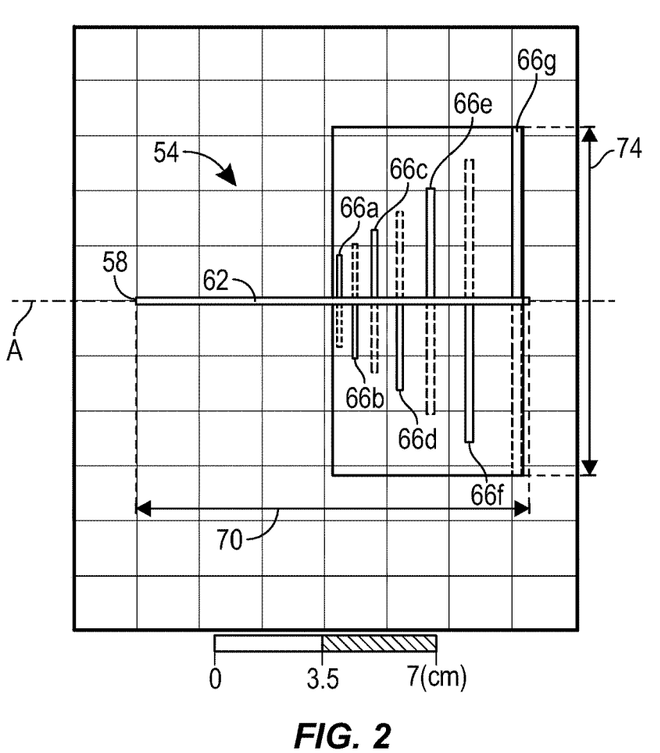
FIG. 2 is a schematic view of an exemplary embodiment of an antenna unit according to the inventive concepts disclosed herein.

As shown in FIG. 2, an LP antenna unit 54 that may be used in the LP antenna system 30 discussed above includes an RF feed 58, a trunk 62, and seven radiating elements 66a-g arranged on the trunk 62. The RF feed 58 is arranged adjacent the director radiating element 66a (e.g., the shortest radiating element). The LP antenna unit 54 defines a length 70 along an antenna axis A of about 12.7 centimeters, and a profile 74 normal to the antenna axis A of about 12.5 centimeters. In some embodiments, the height or profile of the longest radiating element 66g is about 12.15 centimeters. In some embodiments, the profile of the shortest radiating element 66a is about 4.2 centimeters. In some embodiments, the LP antenna unit 54 provides a bandwidth of about 0.95 GHz to about 2.4 GHz, and maintains a phase center (in terms of wavelength) of under 0.4λ for all radiating elements 66a-g. In some embodiments, the LP antenna unit 54 may be produced on a substrate with a first half of each radiating element dipole arranged on a first surface of the substrate and a second half of each radiating element dipole arranged on a second opposite surface of the substrate. Dipoles arranged on a top surface of the substrate (as shown in FIG. 2) are shown in solid lines, while dipoles arranged on a bottom surface are shown in broken lines. The same dipole notation is shown in the following exemplary embodiments.

Figure 3:
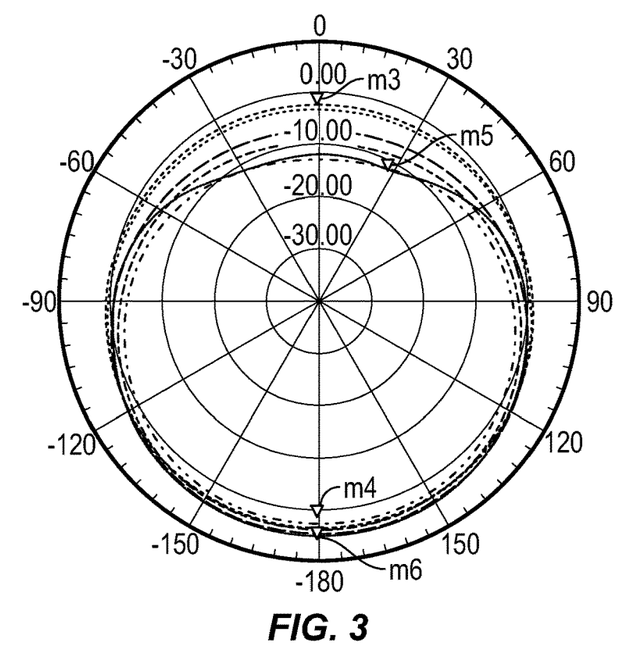
FIG. 3 is an exemplary radiation pattern produced by the antenna unit of FIG. 2.

While the LP antenna unit 54 provides phase center control better than existing LP units for direction finding, a phase center of between about 0.15λ and about 0.2λ is more desirable in some embodiments. Additionally, the LP antenna unit 54 provides a relatively large profile and the radiation pattern tends to be more directional at higher frequencies. A front-to-back (F/B) ratio can be defined at individual frequencies as the ratio of received-signal strength when the antenna is rotated 180°. The LP antenna unit 54 produces a F/B ration of about 5.8 dB at about 1.1 GHz, and a F/B ratio of about 16.6 dB at about 2.26 GHz. FIG. 3 shows an azimuth radiation pattern of the LP antenna unit 54 at between 1.07 GHz and 2.5 GHz.

Figure 4:
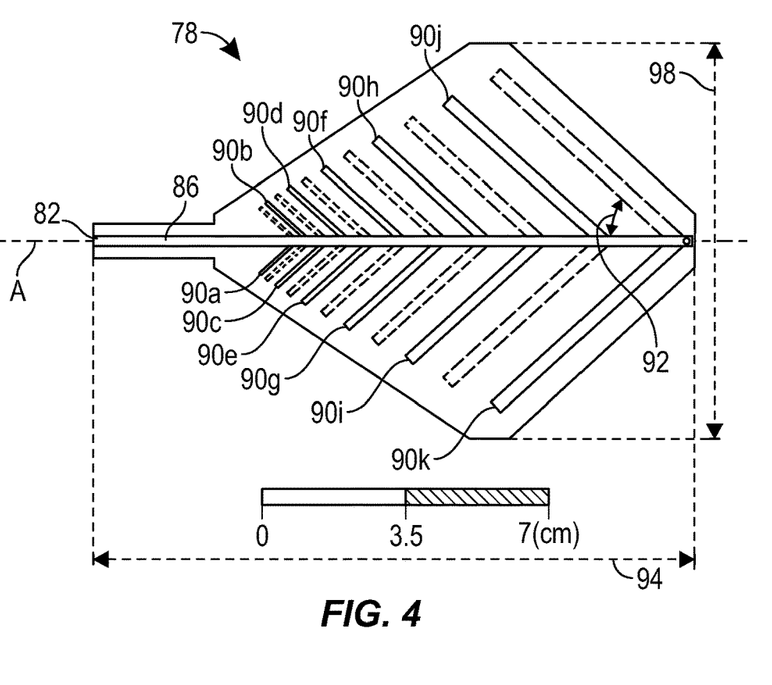
FIG. 4 is a schematic view of an exemplary embodiment of an antenna unit according to the inventive concepts disclosed herein.
Figure 5:
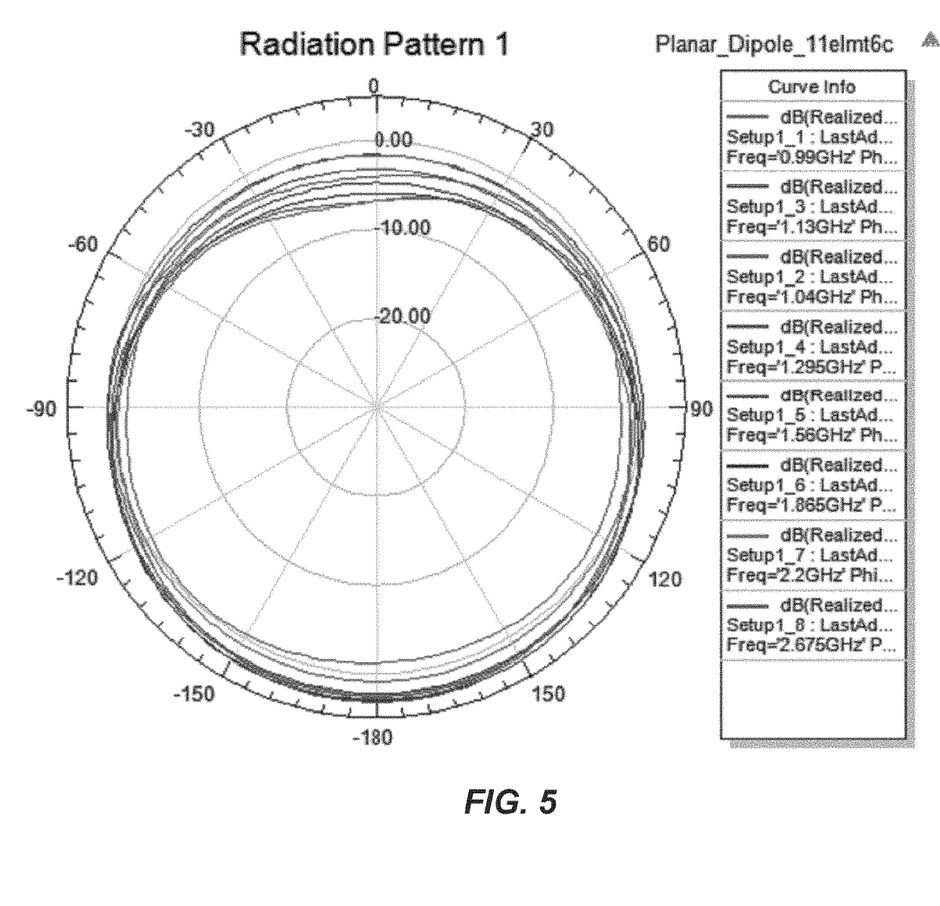
FIG. 5 is a an exemplary radiation pattern produced by the antenna unit of FIG. 4.

As shown in FIG. 4, an LP antenna unit 78 that may be used in the LP antenna system 30 includes an RF feed 82, a trunk 86, and eleven radiating elements 90a-k arranged on the trunk 86. Each of the radiating elements 90a-k as attached to the trunk 86 at an angle 92. The illustrated angle 92 is about forty degrees (40°). The LP antenna unit 78 defines a length 94 along an antenna axis A of about 15 centimeters, and a profile 98 normal to the antenna axis A of about 9 centimeters. In other words, a length of the radiating element 90k itself is about 6 centimeters, but the profile of the radiating element 90k is about 3.9 centimeters. The LP antenna unit 78 provides a bandwidth of about 1 GHz to about 3 GHz, and maintains a phase center (in terms of wavelength) of under 0.4λ for all radiating elements 90a-k. The angle 92 provides a defocusing effect on the radiation pattern that combats the directionality discussed above with respect to the LP antenna unit 54. The LP antenna unit produces a F/B ratio of about 2.46 dB at about 0.99 GHz, and a F/B ratio of about 9.8 dB at about 2.675 GHz. This provides a reduction in F/B ratio of about 37 percent to about 57 percent when compared to the LP antenna unit 54. FIG. 5 illustrates gain in dB relative to the angle of arrival (theta) for various frequencies. The difference between the maximum dB reading and the minimum dB reading for a given frequency determines the F/B ratio.

Figure 6:
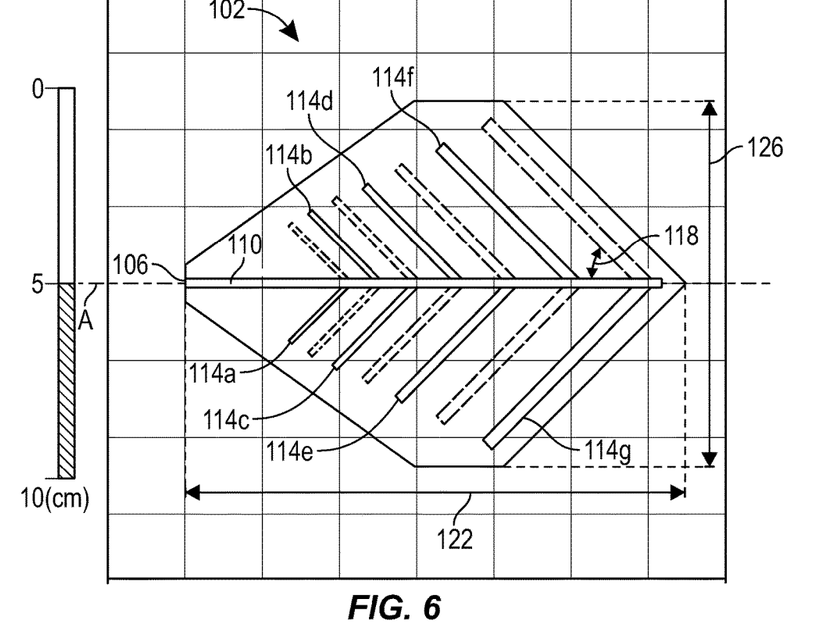
FIG. 6 is a schematic view of an exemplary embodiment of an antenna unit according to the inventive concepts disclosed herein.
Figure 7:
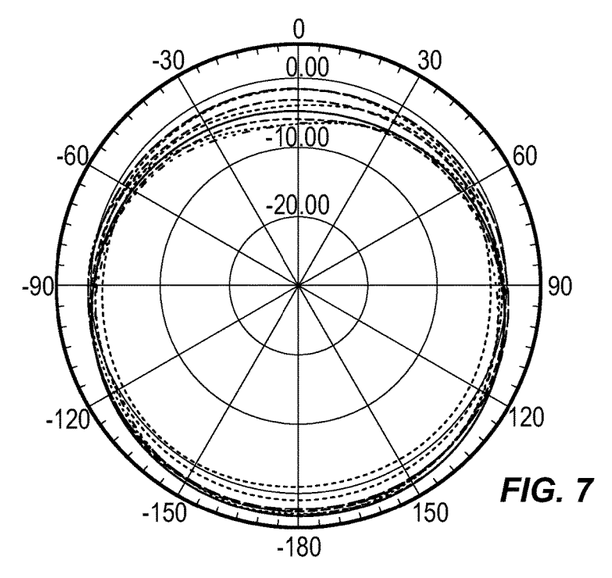
FIG. 7 is an exemplary radiation pattern produced by the antenna unit of FIG. 6.

FIG. 6 shows an LP antenna unit 102 that is similar to the LP antenna unit 78 and including an RF feed 106, a trunk 110, and seven radiating elements 114a-g arranged on the trunk 110 at a forty-five degree (45°) angle 118. The LP antenna unit 102 defines a length 122 along the antenna axis A of about 13.0 centimeters, and a profile 126 normal to the antenna axis A of about 9.5 centimeters. In other words, the LP antenna unit 102 is similar dimensionally to the LP antenna unit 78 but includes seven radiating elements 114a-g. The phase center distances and the F/B ratios produced by the LP antenna unit 102 is similar to that produced by the LP antenna unit 78. FIG. 7 shows a radiation pattern produced by the LP antenna unit 102 at frequencies between about 1 GHz and about 3 GHz.

Figure 8:
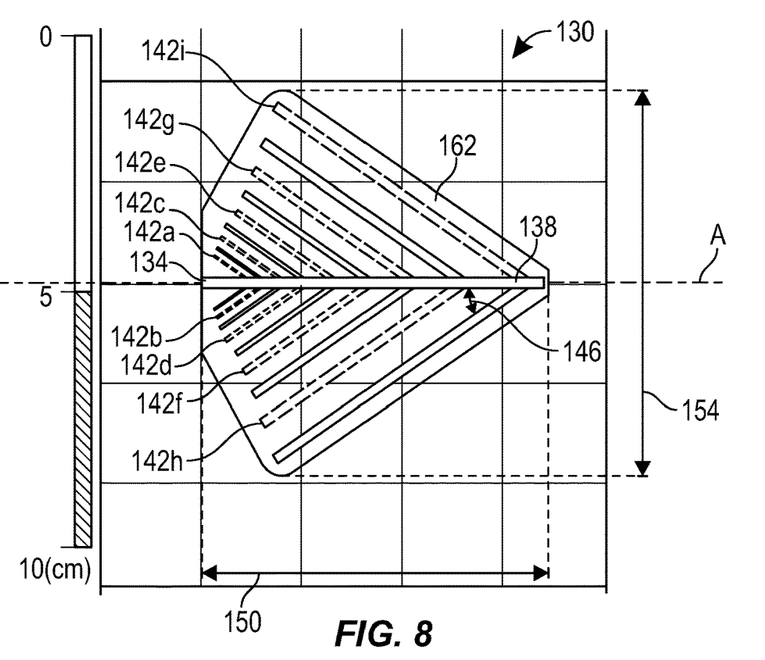
FIG. 8 is a schematic view of an exemplary embodiment of an antenna unit according to the inventive concepts disclosed herein.
Figure 9:
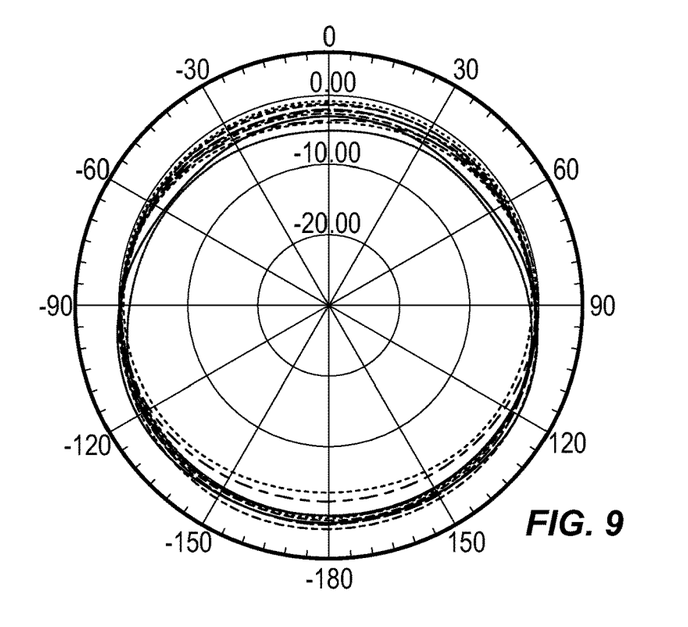
FIG. 9 is an exemplary radiation pattern produced by the antenna unit of FIG. 8.

As shown in FIG. 8, an LP antenna unit 130 that may be used in the LP antenna system 30 discussed above includes an RF feed 134, a trunk 138, and nine radiating elements 142a-i arranged on the trunk 138. Each of the radiating elements 142a-i as attached to the trunk 138 at an angle 146. The illustrated angle 146 is about thirty-five degrees (35°). The LP antenna unit 130 defines a length 150 along the antenna axis A of about 6.86 centimeters, and a profile 154 normal to the antenna axis A of about 7.68 centimeters. In other words, a length of the longest radiating element 142i itself is about 12.5 centimeters, but the profile of the radiating element 142i is about 7.68 centimeters. The LP antenna unit 130 provides a bandwidth of about 1 GHz to about 3 GHz, and is sized to maintain a phase center (in terms of wavelength) of between about 0.15λ and about 0.2λ for all radiating elements 142a-i. The angle 146 reduces the profile 154 of the LP antenna unit 130 by about thirty-seven percent (37%) when compared to the LP antenna unit 54 (see FIG. 2), and the constraint of the phase center distance results in a length reduction of about forty-four percent (44%) when compared to the LP antenna unit 54. Additionally, the F/B ratio is significantly reduced. FIG. 9 shows a radiation pattern produced by the LP antenna unit 130 at frequencies between about 1 GHz and about 3 GHz. The F/B ratio is about 1.08 dB, and the phase center distance is about 0.17λ.

Figure 10:
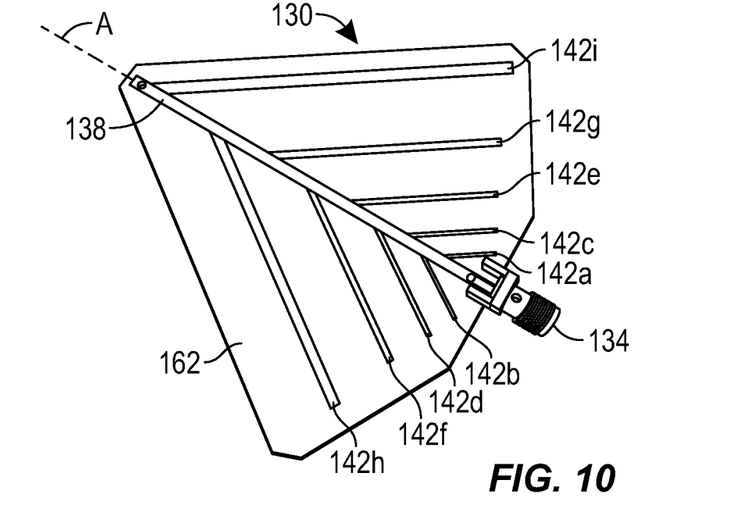
FIG. 10 is a pictorial view of the antenna unit of FIG. 8.

In some embodiments, the LP antenna 130 can be produced by a 3D printer. An associated 3D printing model can specify a substrate 162 that provides structural integrity to the LP antenna unit 130 and isolates dipole halves of each radiating element 142a-i. In one example, one dipole half of the radiating elements 142a-i is disposed on a first side of the substrate 162, and the other dipole half of the radiating elements 142a-i is disposed on a second side of the substrate 162. The substrate 162 is non-conductive or insulating. FIG. 10 shows a fabricated LP antenna unit 130, produced on a 3d printer using the 3D printing model. In one embodiment, the LP antenna unit 130 is produced similar to a 3d printed circuit board (PCB). In one embodiment, the substrate 162 is formed of a grade FR4 glass-reinforced epoxy, and the radiating elements 142a-i and the trunk 138 are formed of nano particle silver ink applied to a sintered thickness of about 200 micron. In some embodiments, the substrate is realized with closed cell foam, etc. In some embodiments, the substrate is a physical structure supporting the radiating elements. In some embodiments, any of the antennas described herein can be produced using 3D printing or using another manufacturing process, as desired.

The LP antenna unit 130 meets all five target parameters. Namely, 1) The LP antenna system 130 is used in the passive LP antenna system 30; 2) the angle 146 defocuses the radiation pattern toward the longer reflector radiating element 142i and reduces directionality (i.e. FB ratio); 3) the radiating elements 142a-i provide a bandwidth of 1-3 GHz; 4) the angled radiating elements 142a-i reduces the profile 154 by about thirty seven percent (37%); and 5) the phase center distance is between about 0.15λ and about 0.2λ.

Figure 11:
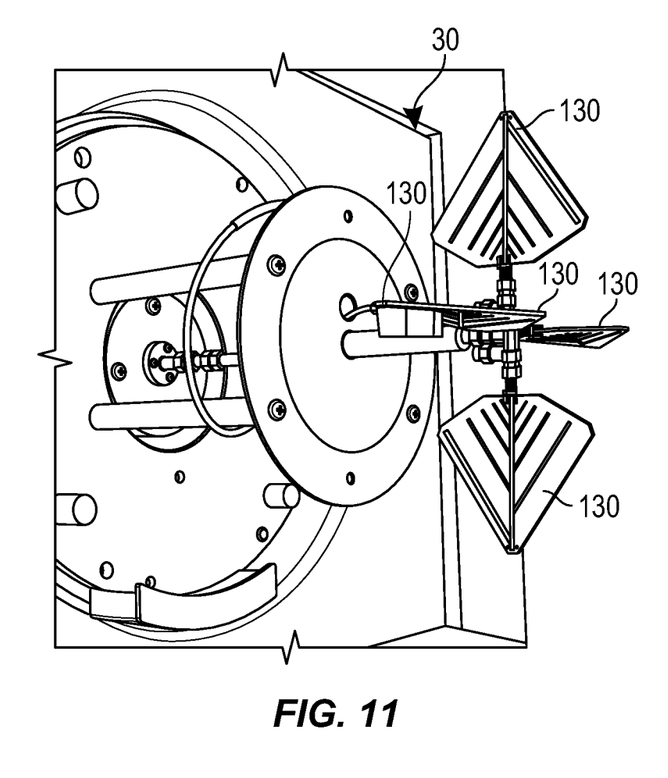
FIG. 11 is a pictorial view of the antenna system of FIG. 1 including the antenna unit of FIG. 8.

As shown in FIG. 11, the LP antenna system 30 includes four LP antenna units 130 and is structured to meet the target parameters 1-5: 1) a simple structure and operational system, 2) an omni-directional radiation pattern, 3) a wide bandwidth (e.g., 1-3 GHz), 4) a low profile, and 5) a desired phase center layout (e.g., a distance between the phase center and a feed center is between about 0.15λ and about 0.2λ). This array can also be implemented using the other elements 78, 102, 130, 166, 170, 174, etc., as previously described.

As shown in FIGS. 12a-d, two LP antenna units 130. can be combined into a dual linear polarization unit 166. The dual linear polarization unit 166 can be used for circularly polarized or dual linear polarized implementations. In some embodiments, the dual linear polarization unit 166 can be used for any arbitrary polarization implementations including circularly, elliptically, or dual linearly polarization by adjusting phase delay or amplitude between two polarization inputs. In the illustrated embodiment, the vertically oriented LP antenna unit 130 is vertically polarized and the horizontally oriented LP antenna unit 130 is horizontally polarized.

In some embodiments, arbitrary polarization is possible, depending on the phase difference of the two superimposed LP antenna units 130.

Figure 12A:
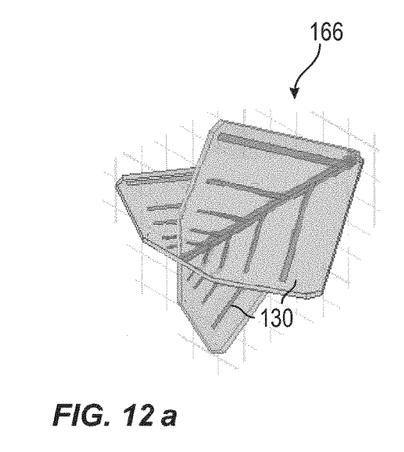
FIG. 12a is a pictorial view of an exemplary embodiment of an antenna unit according to the inventive concepts disclosed herein.
Figure 12B:
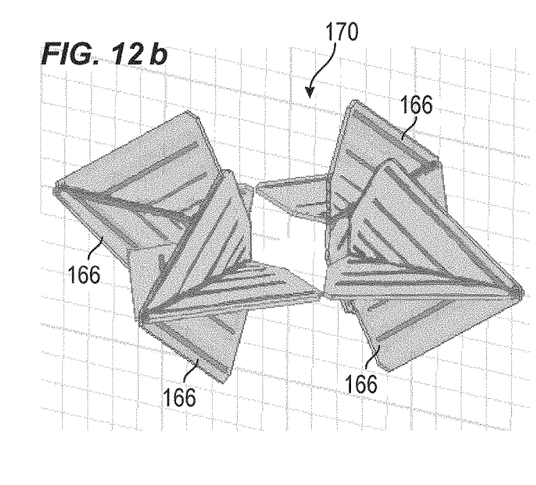
FIG. 12b is a pictorial view of an exemplary embodiment of of an antenna system including four antenna units of FIG. 12a according to the inventive concepts disclosed herein.
Figure 12C:
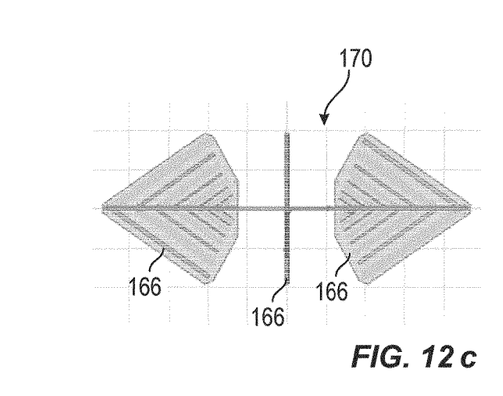
FIG. 12c is a front view of the antenna system of FIG. 12b.
Figure 12D:
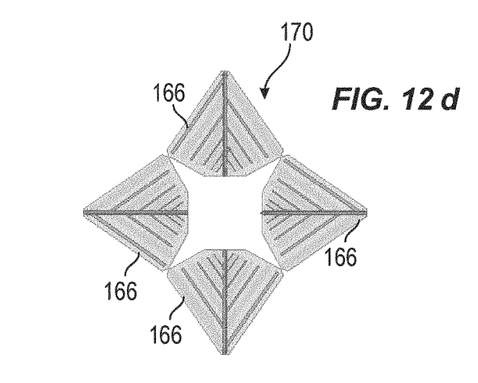
FIG. 12d is a top view of the antenna system of FIG. 12b.

As shown in FIGS. 12*b-d*, four dual linear polarization units 166 can be combined in an LP antenna system 170. The antenna system 170 includes eight antenna units. Four antenna units are structured to communicate a vertical polarization, and four antenna units are structured to communicate a horizontal polarization. Additionally, arbitrary and/or circular polarization are possible.

Figures 13A, 13B:
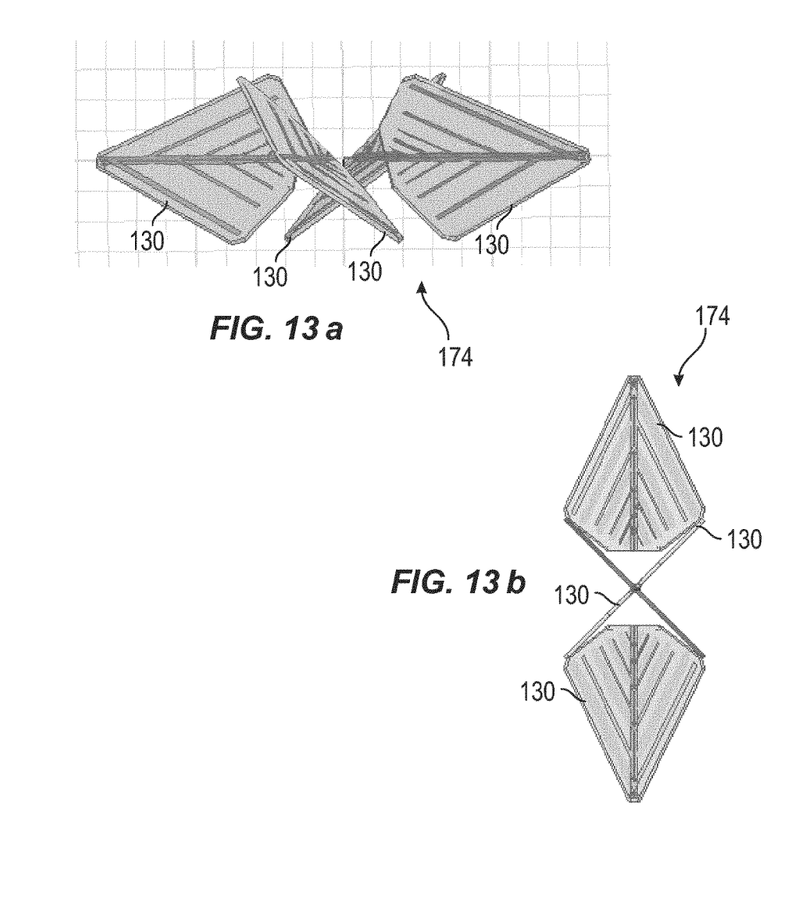
Figure 13C:
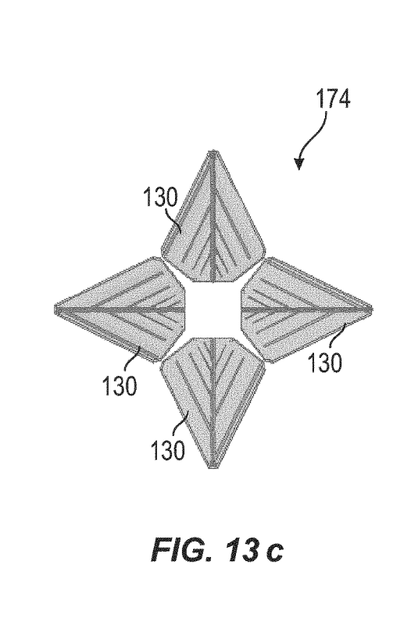

As shown in FIGS. 13*a-c*, a slanted antenna system 174 can be assembled using four LP antenna units 130. Each of the LP antenna units 130 is arranged at a forty five degree (45°) angle relative to vertical to not only capture a vertically polarized signal but also a horizontally polarized signal. The LP antenna units 130 can be rotated either clockwise or counterclockwise relative to vertical, and can be arranged to receive a desired arbitrary polarization with sacrifice of mismatch loss. In some embodiments, the slanted linear configuration receives any arbitrary polarization but with between (0-3) dB polarization mismatch loss, depending on the orientation of the LP antenna units 130 of the electromagnetic wave. In some embodiments, each LP antenna unit 130 is slanted 45 degree to catch all polarizations. The slanted antenna system 174 can be implemented in a direction finding array with all four of the LP antenna units 130 having the same clockwise rotation and angle relative to vertical. Alternatively, diametrically opposed pairs can be oriented ninety degrees (90°) or substantially perpendicular from each other. Each LP antenna unit 130 is structured and angled to minimize coupling (i.e., blockage of omni-directional radiation) between LP antenna elements 130. The slanted antenna system 174 may include a phase offset calibration implemented by a controller (e.g., a radio system).

In some embodiments, the radiating elements disclosed above may be altered. For example, the tau scale of the LP antenna units 78, 102, 130, 166, 170, 174 is about 0.8, but in other embodiments the tau scale may be more than 0.8 or less than 0.8. The number of radiating elements may be changed, the relative sizes of the radiating elements may be changed, and the angle provided between the radiating elements and the trunk may change. In some embodiments, the angle is between about twenty-five degrees (25°) and about sixty-five degrees (65°). In some embodiments, the angle is between about thirty-five degrees (35°) and about forty-five degrees (45°).

In some embodiments, the radiating elements may be arranged with different oblique angles relative to the feedline. For example, a first set of one or more radiating elements may be arranged at a first angle, and a second set of one or more radiating elements may be arranged at a second angle. In some embodiments, a third set of one or more radiating elements may be arranged at a third angle. In some embodiments, each radiating element is arranged at a different angle tuned to produce an improved radiation pattern (e.g., improved omni-directionality). In some embodiments, the oblique angle of shorter or higher frequency radiating elements is larger than the angle of longer or lower frequency radiating elements. In constructions where the oblique angle of the radiating elements is different, it is undesirable for multiple radiating elements to touch one another or be in contact. For example, if the oblique angle of a longer radiating element is more acute than the oblique angle of a shorter radiating element, the oblique angle of the longer radiating element is configured so no contact exists between the longer radiating element and the shorter radiating element. In some embodiments, if the shorter radiating elements are given a more acute oblique angle, high frequency directivity may be improved.

In some embodiments, half height LP antenna units or slanted monopole LP array units can be provided with a large ground plane. For example, in a vehicular plant form mounting application, a large ground plane may be provided and the profile or height of each LP antenna unit is reduced by half, provide further dimensional advantage. In some embodiments, a tapered bend trunk is provided between the RF feed and each of the radiating elements. In some embodiments, the large ground plane is provided by an aircraft skin, a ground vehicle surface mount, a maritime vessel, etc.

In some embodiments, the radiating elements are replaced with other radiating element types. For example, the radiating elements may be inverted F antennas, invented F antennas in a puck, layered C-disk or PCB elements, serpentine or distorted LP elements, serpentine C-disk elements, or local cavity antennas. In addition, puck like LP scaling of radiating elements is possible. The substrate may be replaced with a substrate that can be used with rigid radiating elements to provide a conforming antenna unit. In some embodiments, four antenna units are diametrically disposed and each antenna element can be printed on a 3D, conformal carrier. 3D printing of the LP antenna units provides a low cost solution that can be changed easily for specific task needs.

In some embodiments, the LP antenna units may be formed using a conventional printed circuit board substrate, all metal fabrication and assemblies with minimally sized dielectric spacers such as stamped sheet metal and metallic rod assemblies, 3D plastic (dielectric) additive manufacture of the antenna structure with post electroplating, and/or direct (non-ink process) metallic 3D additive manufacture. Other construction methods exist and aspects of the features disclosed herein may be applied to these and other construction techniques. Each construction method can process be optimized for different frequency ranges.

While the detailed drawings, specific examples, detailed algorithms and particular configurations given describe preferred and exemplary embodiments, they serve the purpose of illustration only. The inventions disclosed are not limited to the specific forms and reticles shown. For example, the methods may be performed in any of a variety of sequence of steps. The hardware and electrical configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific mechanical components and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:
1. An apparatus, comprising:
    a radio frequency feed configured to connect to a feedline; and
    a plurality of radiating elements coupled with the radio frequency feed, each radiating element arranged at an oblique angle relative to an antenna axis and configured to radiate at a wavelength ($\lambda$), wherein the plurality of radiating elements define a phase center distance between about 0.15λ and about 0.2λ.

2. The apparatus of claim 1, wherein the plurality of radiating elements comprise nine radiating elements.

3. The apparatus of claim 1, wherein the plurality of radiating elements emit or receive a bandwidth of about 1 GHz to about 3 GHz.

4. The apparatus of claim 1, wherein the apparatus defines a profile height less than about eight centimeters.

5. The apparatus of claim 1, wherein one the plurality of radiating elements is a director radiating element and the radio frequency feed is positioned adjacent the director radiating element.

6. The apparatus of claim 1, wherein the oblique angle is between about twenty-five degrees (25°) and about sixty-five degrees (65°).

7. The apparatus of claim 1, wherein the oblique angle is about thirty-five degrees (35°).

8. The apparatus of claim 1, wherein the oblique angle of each of the plurality of radiating elements is equal.

9. A system, comprising:
a plurality of log periodic antenna units, each comprising
a substrate,
a radio frequency feed coupled to the substrate and configured to connect to a feedline, and
a plurality of radiating elements coupled with the substrate, each radiating element arranged at an oblique angle of between about twenty-five degrees (25°) and about sixty-five degrees (65°) relative to an antenna axis; and
a controller in communication with the radio frequency feed and structured to determine an angle of arrival of a radio signal.

10. The system of claim 9, wherein the plurality of log periodic antenna units comprises four log periodic antenna units, each spaced about ninety degrees from an adjacent log periodic antenna unit.

11. The system of claim 9, wherein the system emits or receives a bandwidth of about 1 GHz to about 3 GHz.

12. The system of claim 9, wherein the plurality of radiating elements are configured to radiate at a wavelength (λ), and define a phase center distance between about 0.15λ and about 0.2λ.

13. The system of claim 9, wherein one the plurality of radiating elements of each log periodic antenna unit is a director radiating element, and the radio frequency feed is positioned adjacent one of the director radiating elements.

14. The system of claim 9, wherein each of the plurality of log periodic antenna units defines a profile height less than about eight centimeters.

15. The system of claim 9, wherein each of the log periodic antenna units is 3D printed.

16. The system of claim 9, wherein the oblique angle of each of the plurality of radiating elements is equal.

17. A method, comprising:
3D printing a non-conductive substrate;
3D printing a first set of radiating element dipoles, each arranged at an oblique angle relative to an antenna axis;
3D printing a second set of radiating element dipoles associated with the first set, each arranged at the oblique angle; and
3D printing a trunk in electrical communication with the first set and the second set.

18. The method of claim 17, wherein 3D printing the substrate comprises a rigid conformal substrate.

19. The method of claim 17, wherein 3D printing the first set and the second set comprises 3D printing each associated radiating element dipole to emit or receive at a wavelength (λ) and to define a phase center distance between about 0.15λ and about 0.2λ.

20. The method of claim 17, wherein 3D printing the substrate comprises constraining a profile of the substrate to less than about eight centimeters.

21. The method of claim 17, wherein 3D printing the first set and the second set comprises sizing the radiating element dipoles to receive and emit between about 1 GHz to about 3 GHz.

22. The method of claim 17, wherein the oblique angle is between about twenty-five degrees (25°) and about sixty-five degrees (65°).

23. The method of claim 17, wherein the oblique angle of each radiating element dipole is equal.

* * * * *